United States Patent
Williams

(10) Patent No.: US 7,055,908 B1
(45) Date of Patent: Jun. 6, 2006

(54) EXTENDED INTERFACED, UNDER AND AROUND CHIN, HEAD SUPPORT SYSTEM FOR RESTING WHILE SITTING

(76) Inventor: Don C. Williams, 9930 Lake Forest Blvd., Suite F, New Orleans, LA (US) 70129

(*) Notice: Subject to any disclaimer, the term of this patent is extended or adjusted under 35 U.S.C. 154(b) by 875 days.

(21) Appl. No.: 09/670,606

(22) Filed: Sep. 26, 2000

(51) Int. Cl.
*A47C 7/36* (2006.01)
(52) U.S. Cl. .................................. 297/392; 297/393
(58) Field of Classification Search ............... 297/392, 297/393, 397
See application file for complete search history.

(56) References Cited

U.S. PATENT DOCUMENTS

| | | | |
|---|---|---|---|
| 2,582,571 A | | 1/1952 | Thoma |
| 2,774,601 A | * | 12/1956 | White ..................... 297/393 X |
| 3,320,950 A | * | 5/1967 | McElvenny ................. 297/392 |
| 3,645,259 A | | 2/1972 | Schulman |
| 3,814,942 A | | 6/1974 | Darden |
| 3,929,309 A | | 12/1975 | De Vore |
| 4,097,086 A | | 6/1978 | Hudson |
| 4,183,583 A | | 1/1980 | Zuesse |
| 4,565,408 A | | 1/1986 | Palley |
| 4,707,031 A | | 11/1987 | Meistrell |
| 4,753,478 A | | 6/1988 | Weinreich |
| 4,757,554 A | | 7/1988 | Blair |
| 5,108,150 A | | 4/1992 | Stas et al. |
| 5,378,042 A | | 1/1995 | Daneshvar |
| 5,471,690 A | | 12/1995 | McNeill |
| 5,505,523 A | | 4/1996 | Wang |
| 5,758,375 A | | 6/1998 | Horowitz |
| 5,868,471 A | | 2/1999 | Graham et al. |
| 6,007,156 A | | 12/1999 | Chang |
| 6,219,865 B1 | * | 4/2001 | Stokesbary ............. 297/392 X |

OTHER PUBLICATIONS

"Don't let driving be a pain in the neck!", American Aubomobile Association magazine, 1998, p. 28.

* cited by examiner

*Primary Examiner*—Anthony D. Barfield
(74) *Attorney, Agent, or Firm*—Pugh/Assoc., Patent & TM Attys.; C. Emmett Pugh

(57) ABSTRACT

A head support system for supporting the user's head in an at least generally upright disposition, while the user, for example, naps or sleeps or otherwise rests while traveling sitting in a seat. The head support element (1) interfaces with the underside of and, preferably, up and around the front of the chin, i.e., the mental proturberance with its central clef, and underneath the user's chin and from side-to-side of and along side the chin, i.e., the mandible body, in "face-to-face" surface engagement over a relatively large area, essentially forming a supportive cup for the chin, with a self-supporting but soft, solid block of molded, supportive material having an oblong shape with a reduced sized central portion (10) for hand grasping, with its angled, flat bottom (31) resting centrally on the central upper chest area of the user, preferably over and across the manubrium sterni area, with an anchoring strap (41) positioned, for example, around and about the back of the user's neck. The support element is at least generally "Y" shaped with a laterally enlarged base (30) when viewed from the front (FIG. 2). The anchoring strap subsystem (40) includes a "break-away" string-like line (42) attached to the strap with terminal ends (42*a*/42*b*) that extend to the front loosely connected to the block and extend through and past a push-button/barrel lock (43).

18 Claims, 3 Drawing Sheets

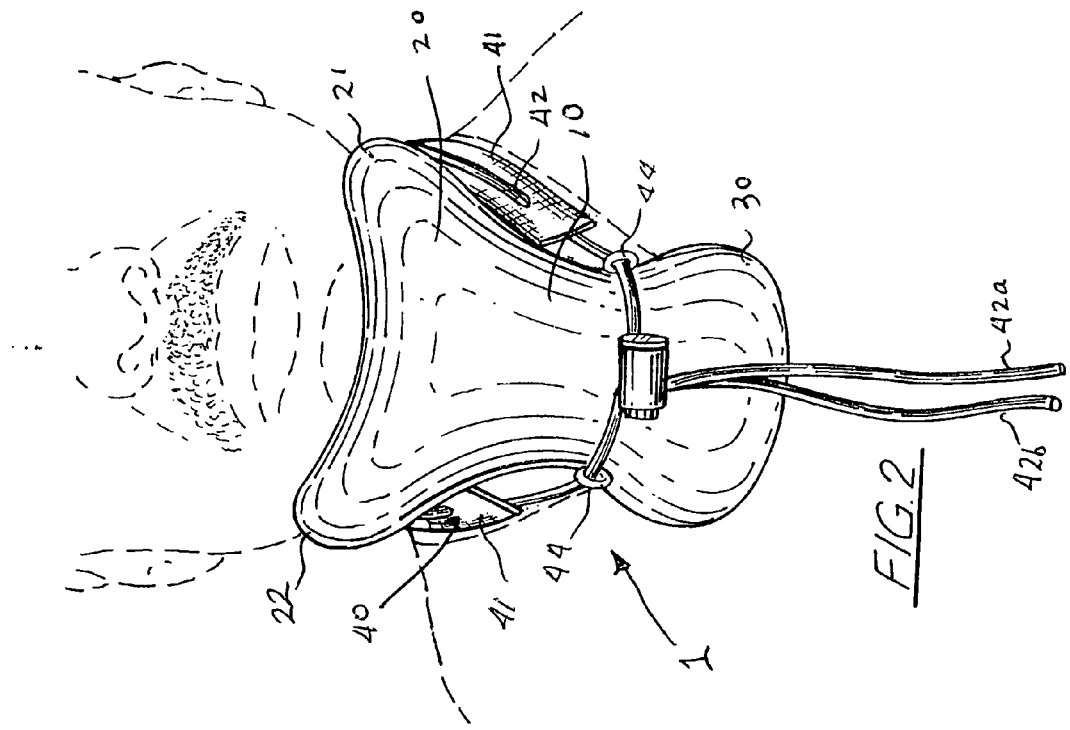
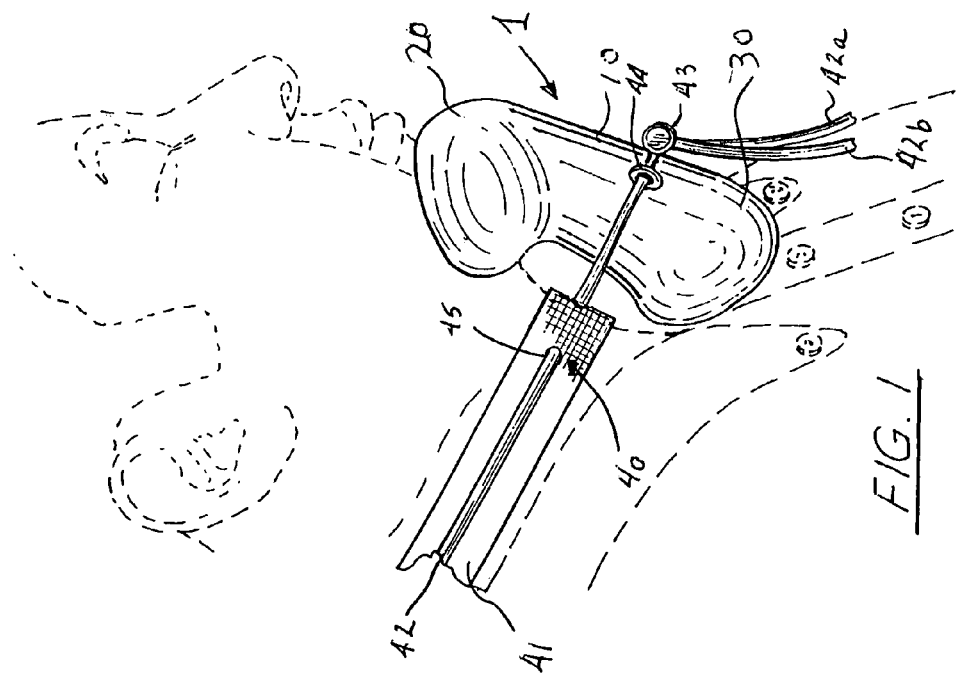

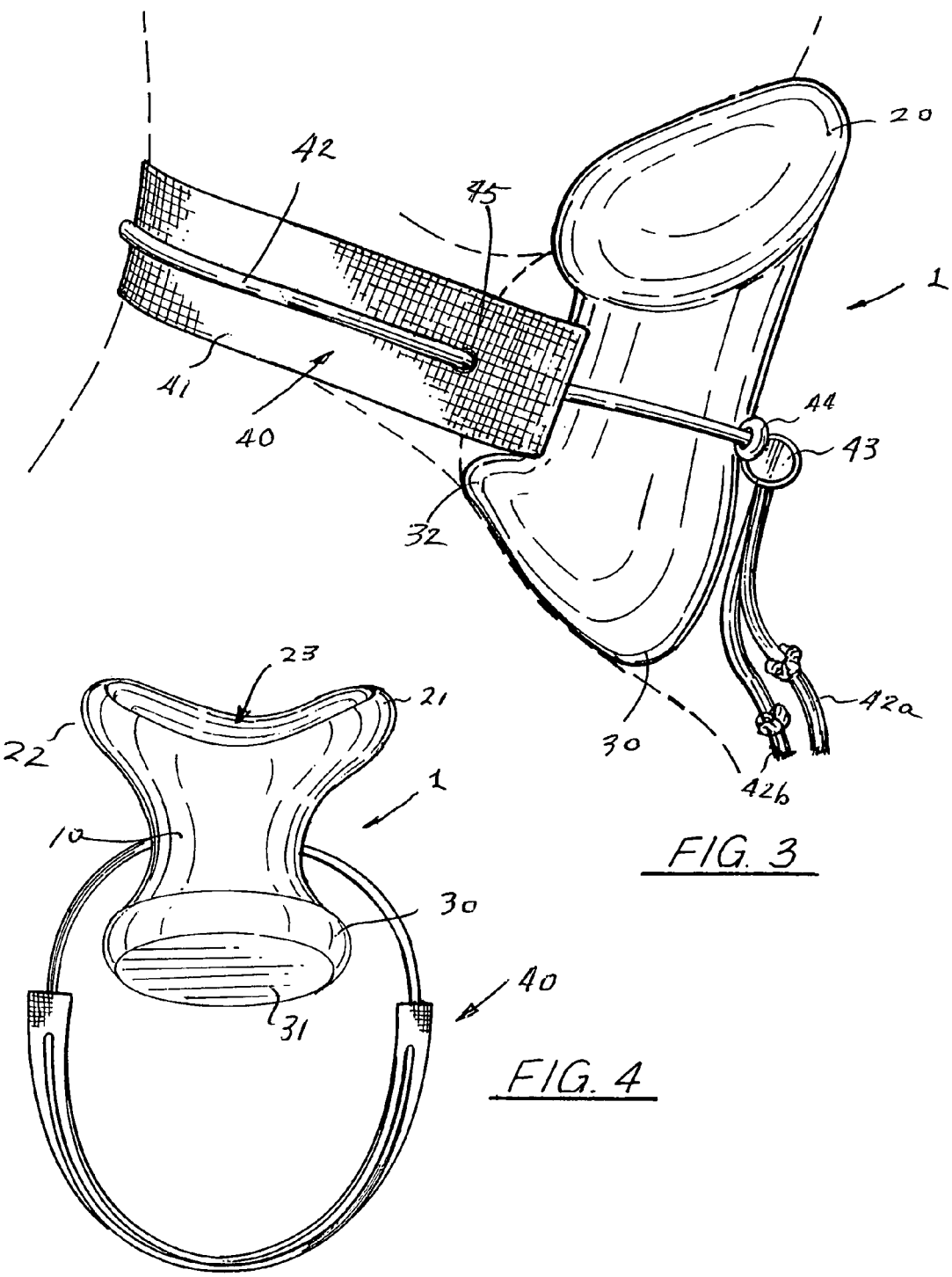

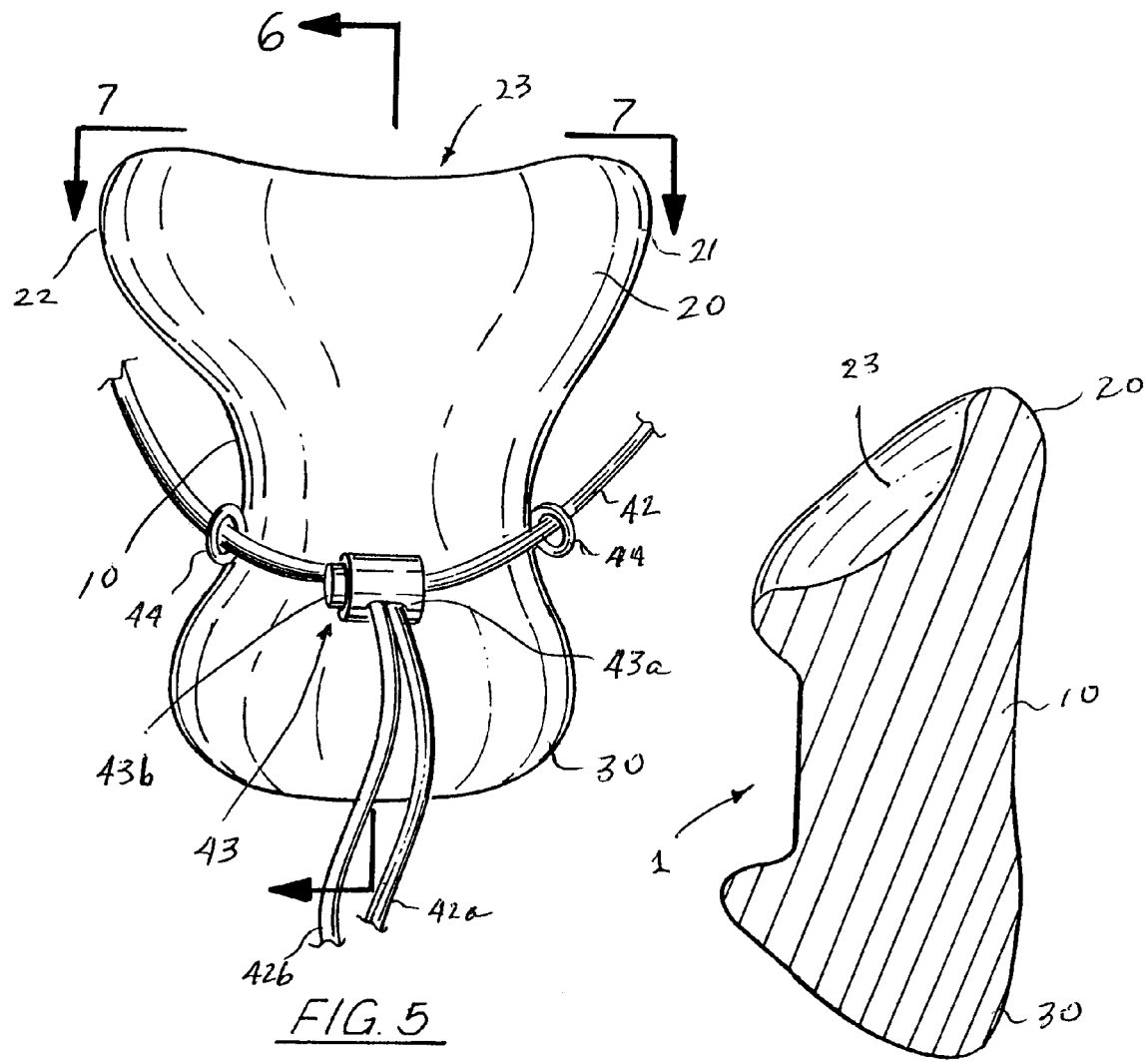
FIG. 5
FIG. 6
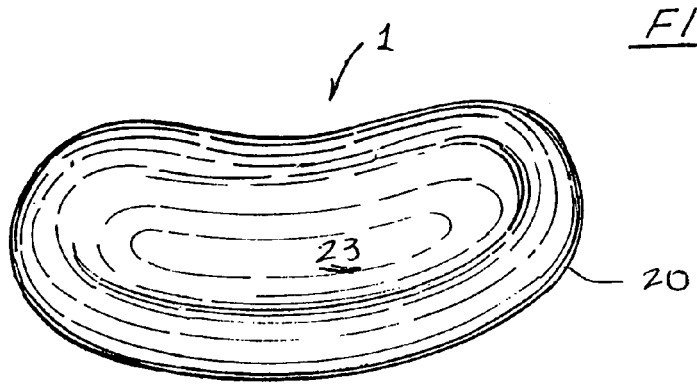
FIG. 7

EXTENDED INTERFACED, UNDER AND AROUND CHIN, HEAD SUPPORT SYSTEM FOR RESTING WHILE SITTING

TECHNICAL FIELD

The present invention relates to a portable, head support system for supporting the user's head in an at least generally upright disposition, while the user, for example, rests, including napping or sleeping while traveling sitting in a seat. The present invention further relates to such a head support system which interfaces with the underside of and up and around the front and sides of the chin and from side-to-side of the chin in "face-to-face" surface engagement over a relatively large chin and surrounding areas using a supportive block of solid molded foam material having an oblong shape with its bottom resting centrally on the upper, central chest of the user, with an adjustable, anchoring strap positioned, for example, around and about the back of the user's neck. Additionally, the present invention is directed to reliable anchoring or attachment subsystem holding the device to the user's body when the user, for example, supports his/her own head with their neck muscles, and to associated means therefor for preventing the head supporting device from being pulled inadvertently into the throat, possibly interfering with breathing.

BACKGROUND ART

The following table lists a number of patents at least some of which may be of general background interest to the present invention, but not all of which are from the art to which the invention pertains.

| Patent No. | Patentee(s) | Date |
| --- | --- | --- |
| 2,582,571 | Thoma | Jan. 15, 1952 |
| 3,645,259 | Schulman | Feb. 29, 1972 |
| 3,814,942 | Darden | June. 4, 1974 |
| 3,929,309 | De Vore | Dec. 30, 1975 |
| 4,097,086 | Hudson | Jun. 27, 1978 |
| 4,183,583 | Zuesse | Jan. 15, 1980 |
| 4,565,408 | Palley | Jan. 21, 1986 |
| 4,707,031 | Meistrell | Nov. 17, 1987 |
| 4,753,478 | Weinreich | Jun. 28, 1988 |
| 4,757,554 | Blair | Jul. 19, 1988 |
| 5,108,150 | Stas et al | Apr. 28, 1992 |
| 5,378,042 | Daneshvar | Jan. 3, 1995 |
| 5,471,690 | McNeill | Dec. 5, 1995 |
| 5,505,523 | Wang | Apr. 9, 1996 |
| 5,758,375 | Horowitz | Jun. 2, 1998 |
| 5,868,471 | Graham et al | Feb. 9, 1999 |
| 6,007,156 | Chang | Dec. 28, 1999 |

Also, note the American Automobile Association's magazine of 1998, p. 28, and its ad entitled "Don't let driving be a pain in the neck!" for a wedge shaped, foam filler positioned against the car seat around the back of the neck and the sides of the neck of the user for neck supportive use while driving. Additionally, a blow-up cushion similar to the configuration of this device is also known and has been on the market for a number of years.

The prior art has suggested a number of different approaches for the support of the human head, typically while the user is napping or sleeping, while sitting.

With respect to an under-the-chin approach broadly, the '259 patent to Schulman, which is not from the art to which the present invention pertains, is directed to an automatically inflatable, aviator's head positioning and restraining device which is inflated during an emergency to allow the user to best withstand the high "g" damaging effects of sudden acceleration and deceleration during an ejection from, or the crash of, an airplane. However, even in this non-prior art, emergency crash system, the head supporting element is not solid and therefore not always present when located on the user but only when an emergency arises and only supports the underside of the chin and provides no on-the-sides or even side-to-side or any front support.

The De Vore '309 patent, likewise not from the art to which the present invention pertains, is directed to a non-portable, head rest for use in a beauty parlor to hold the head in a set position to prevent the user from contacting the hot parts of a hair drying machine and uses two, curved, hinged, metallic side pieces which are relatively thin and therefore provide hard, substantially unyielding, support over a very limited part of the underside of the bottom of the head spaced away from the chin.

The Palley '408 patent is directed to a portable head support for sleeping or resting in a sitting position (the art to which the invention pertains) which uses a flexible band (14) extending from side-to-side underneath the chin supported by two, thin, rigid, side supports ("plaques" 11 & 12) resting on the user's collar bone (note FIGS. 5 & 6) on either side of the head supporting the band like a "hanging bridge," which applies all of the weight of the head on two, very limited, thin strip areas of the user's body, namely, only on the shoulder-collar bones with a thin, orthogonal interface.

This relatively high intensity, concentrated application of the forces from the head's weight is relatively uncomfortable. This is in contrast to the wide area application, solid block material approach of the present invention, which extends solidly with a soft interface, foam material directly down to the user's central, upper chest over a relatively wide area distributing the head weight forces over that relatively wide area, particularly the area overlying the strong, laterally extended, manubrium sterni bone area. Additionally, there is no side support or front support of the over-all chin area, in contrast to the cup-like, full support provided in the present invention.

Likewise there is no reliable anchoring or attachment subsystem for holding the device to the user's body when the user, for example, supports his/her own head with his/her respective neck muscles and then raises the head and moves the head from side-to-side, or any associated means therefor for preventing the device from being pulled into the throat, possibly interfering with breathing, as in another aspect which is achieved in the preferred embodiment of the present invention.

It is further noted that apparently there has been, no commercial success to the Palley invention and hence no established practicality or utilitarian appeal to his approach, as his patent now stands effectively abandoned due to the non-payment of its second maintenance fee. Thus, one of ordinary skill would likely not look to the Palley disclosure for any meaningful guidance.

GENERAL SUMMARY DISCUSSION OF INVENTION

Thus, in contrast to the relevant prior art, the present invention in its preferred embodiment is directed to a head support system for supporting the user's head in an at least generally upright disposition, while the user, for example, naps or sleeps or otherwise rests, while traveling sitting in a seat, for example, in a bus, plane, motor vehicle or the like, with the head support element interfacing with the underside of and, preferably, up and around the front and sides of the chin and from side-to-side of the chin and underneath the rest of the exposed bottom of the head back toward the top of the neck area in "face-to-face" engagement over a relatively large area with a soft but self-supporting, solid, foam, supportive material having an oblong, block shape with its extended bottom resting centrally on the upper, central chest area in "face-to-face" surface, extended engagement with the user's manubrium sterni area, and with an anchoring strap positioned, for example, around and about the back of the user's neck with means to prevent the device from being drawn into and against the neck, possibly interfering with breathing. Such an approach provides a very comfortable, reliable, full support of the user's head with a device which is very light in weight, small in size, and easily transportable.

The preferred embodiment further assists in the full interfacing by providing a combined "U" & "V" shaped, upper end portion with a centrally located, curved depression area which substantially matches the general contour of an average person's chin and surrounding facial area and the underneath area approaching the neck, namely, in front of and around and along the mental protuberance with its central cleft, preferably below the mentis, essentially forming a cup for the chin, and a generally bulbous or laterally extended, bottom portion with a bottom surface which preferably is flat and preferably has some flex or give for comfort for comfortable support on the user's strong manubrium sterni area.

Additionally, the present invention is directed to reliable anchoring or attachment subsystem always holding the device when positioned for use to the user's body, even when the user, for example, supports his/her own head with his/her neck muscles and moves the head from side-to-side, and to associated means therefor for preventing the head supporting device from being pulled inadvertently into and compressively against the throat, possibly interfering with breathing.

The preferred, supplemental anchoring or attachment of the support element to the user's body is a soft material strap extending back around the neck with a string or other form of line having terminal ends which are attached at the front by preferably a push-button/barrel latch operating on the end portions of the line. The line is easily cinched up while the button is depressed and locked by releasing the button in, for example, the line's cinched up disposition, and thereafter unlocked with again the simple press of the button and a pulling in of the line ends toward the back and/or the pulling out of the then unlocked lock with respect to the line ends while the user, for example, grasps and holds the device's central shank with the other hand.

As will be seen in connection with the preferred embodiment, the head supporting device or element, with its lateral and longitudinal extensions at the upper and lower ends of the device in combination, with their respective contacts with— the chin area, namely, from the front and along and over the sides of the mental protuberance and its central cleft (preferably below the mentis), namely the symphysis of the mandible, back along the mandible body toward the neck, and the chest area of the user, particularly in and over and across the manubrium sterni area, prevent the device from being pulled in against the throat area, including preferably the thyroid cartilage, the arytenoid cartilage, the cricoid cartilage and the tracheal cartilages, 'and adjacent' areas, when the line ends are cinched up past the preferred push-button/barrel lock in attaching the device to the user for use as a head support. Additionally, with the bottom of the device being upwardly angled at its rear at, for example, forty-five (45°) degrees, causes the device to rise, rather than uncomfortably "dig in," as it is moved back, strengthening the engagement of the device with the user's chin area, further preventing or at least discouraging the device from being moved back against the user's throat.

Also, it is desirable that the latching string line be made of a material that preferably is designed to be limited in its strength, that is, designed to break when the forces on it become too great, as, for example, might occur when the strap or line gets entangled on something as the user's falls while wearing the device. Supplemental, replacement lines could be included with the device as a commercial product for the user to be able to immediately put the device back to use in the case of such an unlikely event actually happening.

It is thus a basic object of the present invention to provide a light weight, portable support for a user's head while the user is seated for resting, for example, napping or sleeping or relaxing and the like during, for example, travel, which is very comfortable and reliable, preferably supporting the user's head all about the chin area and underneath the user's head weight over a wide, central, upper chest area, particularly over and across the manubrian sterni area.

It is still a further object to improve the interfacing of the oblong block of supporting material by including at its upper end a combined "U" & "V" shaped, downwardly angled, depression area for enhanced interfacing of the upper surface of the block material with the chin and surrounding facial and side and front areas.

It is also an object to additionally provide a reliable anchoring or attachment subsystem holding the device to the user's body even when the user, for example, supports his/her own head with his/her neck muscles, and to associated means therefor for preventing the head supporting device from being pulled inadvertently into the throat, possibly interfering with breathing.

It likewise is still a further object of the invention to provide an easily actuated and de-actuated attachment subsystem attaching and securing the support element to the user's body, preferably around the neck, using a strap/string/button-barrel subsystem.

It is also a supplemental object to provide such a head support system which can be easily grasped and held in the hand of the user for ease in moving and positioning the head support element preparatory to use and positioning and at the time of removal.

It is likewise an object to provide such a head support system which is safe in use.

BRIEF DESCRIPTION OF DRAWINGS

For a further understanding of the nature and objects of the present invention, reference should be had to the following detailed description, taken in conjunction with the accompanying drawings, wherein:

FIG. 1 is a side view of the preferred, exemplary embodiment of the head support system of the present invention in use, showing the user in phantom line.

FIG. 2 is a front view of the preferred, exemplary embodiment of the head support system of the present invention in use, again showing the user in phantom line.

FIG. 3 is a close-up side view of the preferred, exemplary embodiment of the head support system of the present invention in use, likewise showing the user in phantom line, in which the physiology of the contact areas around the chin and the chest and non-contact areas at the throat can be readily seen and/or understood.

FIG. 4 is plan, rear view of the preferred embodiment of the head support system of the present invention by itself, showing its flat bottom and its top with its curved, combined "U" & "V".shaped, interfacing depression and the loop formed by the strap/string/latch attachment subsystem.

FIG. 5 is front view of the preferred embodiment of the head support system of the present invention by itself FIG. 6 is a side, cross-sectional view of the head support system of FIGS. 4 & 5, taken along section lines 6—6 of FIG. 5.

FIG. 7 is a top view of the head support system of FIGS. 4 & 5, taken along perspective lines 7—7 of FIG. 5.

EXEMPLARY MODES FOR CARRYING OUT THE INVENTION

Listing of Reference Numbers

For ease of reference to the drawings, the drawing reference numbers are listed below.

| | | |
|---|---|---|
| 1 | | head support element |
| 10 | | central shank portion of head support element |
| 20 | | top portion of head support element |
| | 21 | left side edge of "V" shape |
| | 22 | right side edge of "V" shape |
| | 23 | curved interfacing depression |
| 30 | | bottom portion of head support element |
| | 31 | flat bottom surface |
| 40 | | user attachment sub-system |
| | 41 | strap of webbing material |
| | 42 | "shoe-string" like line |
| | 42a | one end of string line |
| | 42b | other end of string line |
| | 43 | latch |
| | 43a | barrel of latch |
| | 43b | push button of latch |
| | 44 | line/support-element attachment points |
| | 45 | openings through strap section |

As can be seen in the figures, the preferred embodiment of the head support system of the present invention includes a head support element 1 which has a central, reduced-cross-section, shank portion 10 flaring up and out to a top, support, chin-plus engaging portion 20 and flaring down and out to a bottom, central chest contacting foundation portion 30. These three portions 10/20/30 in combination form a solid, oblong block of self-supporting but soft surface, supporting material, with the material having sufficient structural strength to support the weight of at least an adult human head and its own weight without collapsing. It is noted that the term "solid" when used herein includes material with air holes internally within them as, for example, occurs in molded foam material.

The central portion 10 is rounded and longitudinally extended, having curved, side surfaces of a size and contour which is easily grippable in one hand by the user for moving it about and placing it in position for use. In general, preferably all of the side and end surfaces of the head support element 1 are curved and smooth, as illustrated.

The top portion 20 forms an angled, curved, combined "U" & "V" shape with left and right, side, lobe portions 21 & 22, respectively. Centrally between the side edges 21/22 at the very top of the top portion 20 is an angled, curved depression area 23 of a general contour to interface well with the average contour of the typical user's chin and surrounding areas, so that the top portion 20 interfaces with the user's chin and surrounding, side facial and underneath areas in "face-to-face" soft surface engagement (note particularly FIGS. 4, 6 & 7 in connection with FIGS. 1–3). The curved depression area 23 is angled downwardly toward the user, when viewed from either side (note FIG. 1), and angled downwardly from both of the sides to the center, when viewed from the front (note FIG. 2), in essence forming an encompassing cup for the user's chin areas in the depression, with substantial side-to-side support, as well as underneath and frontal chin support and/or contact.

The bottom portion 30 preferably is curved and bulbous or laterally expanded or extended in shape with a flat, angled bottom 31 (note FIG. 4), angled upwardly toward the bottom of the user's neck. The flat, bottom surface 31 preferably has some resilient flex or give to it, enhancing its comfort and flexibility.

As can be seen in FIG. 2, when viewed from the front, the head support element 1 forms a general "Y" shape with a laterally extended base. This design produces a very stable, reliable, comfortable support for the user's head, particularly when the user's neck muscles are relaxed.

As can be seen in FIG. 2, when viewed from the front, the head support element 1 forms a general "Y" shape with a laterally extended base. This design produces a very stable, reliable, comfortable support for the user's head, particularly when the user's neck muscles are relaxed. Additionally, as can be seen in FIG. 2, the head support element 1 is symmetrical about the center-line-plane defined by the plane through the centers of the user's nose and chin.

With reference to FIGS. 1 & 2, the head support element 1 supports the user's head in an at least generally upright disposition, while the user, for example, rests, including napping or sleeping, while traveling sitting in a seat, for example, in a bus, plane, motor vehicle or the like, with the top portion 20 of the head support element 1 interfacing with the underside of and, preferably, up and around the front and sides of the chin and from side-to-side of the chin and underneath the rest of the exposed bottom of the head, back to the point or area approaching the top of the neck (note FIGS. 1 & 3), in "face-to-face" engagement over a relatively large area with a soft foam, solid, supportive material with its bottom surface 31 resting centrally on the user's upper, central chest area. Such an approach provides very comfortable, reliable support of the user's head with a device which is very light and easily transportable.

The support element 1 preferably is attached to the user with an attachment subsystem 40 including an anchoring strap 41 positioned, for example, around and about the back of the user's neck (note FIGS. 1 & 3). The webbed strap material 41 preferably includes an interleaved, attachment, shoe-string-like line 42 having ends 42a & 42b connected together and fixed in their relative positions by a push-button latch or lock 43, comparable to those used on jackets and the like. Such string latches 43 are generally in their locked disposition, and, when it is desired to adjust the ends 42a & 42b of the string 42, the button 43b is pushed or depressed down into the barrel 43a, allowing the string ends to be readily moved through the latch.

The around-the-neck strap 41 and the line 42 together form a longitudinally extended, flexible member capable of forming an around-the-neck loop of varying diameter with sufficient strength to hold the device 1 to the user's head in normal operation. The strap 41 can be of webbing material as illustrated, or, more preferably, a soft, for example, foam material or any other material that can perform its function as well as be comfortable on the user's neck.

When it is desired to put the head support element 1 to use, starting as in FIG. 4, the circumference of the string 41 forming the loop shown in the figure is adjusted to as large a size as needed to loop the loop around the user's head by depressing the push button 43b and pulling back on the loop while the button is depressed. The properly sized loop is then placed by the user over the user's head.

The string ends 42a & 42b are then pulled out away from the user, drawing the support element 1 toward the user's neck and chin, while the button 43b is depressed, until the support element 1 is drawn into comfortable engagement with the user's chin and surrounding areas and the upper, central chest area. The button 43b is then let go and the support element 1 is then locked into place on the user.

It is desirable that the latching string line 42 preferably be made of a material that is designed to be limited in its strength, that is, designed to break when the forces on it become too great, as, for example, might occur when the strap or line 42 gets entangled on something as, for example, the user's falls while wearing the device. This likewise effectively provide a safety release. Supplemental, replacement lines could be included with the device when issued as a commercial product for the user to be able to immediately put the device back to use in the case of such an unlikely event actually happening.

As can best be seen in FIGS. 1 & 3, in combination the lateral and longitudinal extensions at the upper (20) and lower (30) ends of the device 1, with their respective contacts with— the chin area, namely, from the front of and back along and up over the sides of the mental protuberance and its central cleft, i.e., the symphysis of the mandible, back along the body of the mandible, toward the neck, and the chest area of the user, particularly over the manubrium sterni area, prevent the device 1 from being pulled in against the throat area, including preferably the thyroid cartilage, the arytenoid cartilage, the cricoid cartilage and the tracheal cartilages and adjacent areas, when the line ends 42a & 42b are cinched up and the around-the-back-of the neck loop (see FIGS. 2 & 4) is lessened or pulled in.

Thus, it should be understood that the upper portion 20 of the device 1 extends up over the front of and around the sides and bottom of the user's chin, contacting its front, sides and bottom and its tip, namely, over, across and around the mental protuberance and its central cleft (below the mentis), extending all the way back along the underside of the mandible body toward the hinge of the mandible, approaching, for example, the top of the neck, namely, the arytenoid cartilage, in essence cupping the chin and a portion of the mandible body area within it. The angled, bottom portion 30 rests solidly but flexibly on the upper, central portion of the chest, extending laterally over the manubrium sterni area, and up to or approaching the bottom tracheal cartilages of the downwardly extended throat area. This interaction prevents the throat area from being compressively contacted, which could cause interference with the user's breathing.

Additionally, the bottom 30 of the device 1 preferably is upwardly angled at its rear at, for example, a forty-five (45°) degree angle with respect to the "vertical" center-line of the device, that is, the device's "vertical," longitudinally extended axis. This angled design causes the device 1 to rise, rather than uncomfortably "dig in" to the user's chest, as it is moved back, strengthening the engagement of the device with the user's chin area, further preventing or at least discouraging the device from being moved back against the user's throat.

After properly positioning the device 1 and attaching it around the neck, the user then can rest, including napping or sleeping, at will, without worry that, when the neck muscles are relaxed, his/her head will fall forward or to the side, disrupting the user from his/her rest. Instead the head will be well, safely and reliably and fully supported over a broad, central area of the chest and chin with great comfort and ease and no discomfort to the user's throat or chest, including, for example, any discomfort to the user's shoulder collar bones as in the Palley '408 patent.

When the user desires to remove the head support element or device 1, the user again merely depresses the push button 43b, freeing up the loop formed by the majority of the string 42, and pulls the head support element forwardly away from his/her chin and chest areas. The webbed strap 41 is then pulled up over the head, and the support element 1 stowed away until it is again needed for use.

As previously noted, the interfacing of the oblong block 1 of supporting material is enhanced by including at its upper end a combined "U" & "V" shaped, curved, front-to-back and each side-to-center downwardly angled depression 23 for improved interfacing of the upper surface of the block material of the support element 1 with the user's chin and surrounding facial and side areas.

As noted, an easily actuated and de-actuated attachment subsystem 40 attaches the support element 1 to the user's body, preferably around the neck, using a combined strap/string/button-barrel structure 41/42/43. The adjustment string 42 is interleaved (note FIGS. 1 & 4) or otherwise attached to the back strap 41 and is moveable attached to the front of the support element 1 through front-side rings 44 (note FIGS. 1–3). As should be understood, the string line 42 is also free to move through the ring openings 45 in the strap material 41.

Thus, thereby, the preferred embodiment of the present invention provides a light weight, portable support for a user's head while the user is seated to allow the user to rest, nap, sleep or the like during, for example, travel, which is very comfortable and reliable, supporting the user's head preferably all about the chin area and underneath the rest of the exposed underside of the head in "face-to-face," side-to-side, wide area interfacing, while causing the user's head weight to be distributed over a relatively wide area over the central upper chest of the user. It does this preferably with a solid block of supporting foam material which provides soft engagement with the user's body while serving to give wide support to the underside of the head and chin while also applying the user's head weight over an extended, upper, central chest area of the user, particularly over and across the manubrium sterni.

A suitable material used in making a prototype device for the solid block material of the head support element 1 was a modeling compound marketed under the famous Crayola's "Magic Model"™ mark which has the consistency and feel of the famous "Play-Doh"™ material during the shaping phase and then dries in about twenty-four (24) hours into a fixed, solid but reasonably soft block. Many other materials could be used, but currently preferred is some foamed, molded material, such as, for example, polyurethane. It is likely that, in a commercial device, a different material will be used in place of the prototype's modeling compound material, possibly, for example, as noted, polyurethane of an appropriate density and preferably having a soft, "cooling" skin surface as is readily and well known in the foaming/molding arts.

Exemplary, approximate or "about" dimensions for a "medium" size prototype, which are subject to great variation, are outlined below:

| | |
|---|---|
| approximate overall height | five (5") inches |
| approx. overall side width at top | five (5") inches |
| approx. side width at center | two and a half (2.5") inches |
| approx. side width at bottom | three and a half (3.5") inches |
| approx. depth at top | two and a half (2.5") inches |
| approx. depth at center | one and a half (1.5") inches |
| approx. depth at bottom | two (2") inches |
| approx. angle of bottom surface (with respect to "vertical" center-line of device) | forty-five (45°) degrees |

It is contemplated that in a commercial embodiment of the invention, the device 1 possibly will be provided in several sizes, for example, namely, "small," "medium" and "large" sizes.

Many changes and variations are possible in the embodiments of the present invention. For example, rather than securing the support element 1 directly to the user, it could be secured in place on the user by attaching the support element to the seat in which the user is sitting or some other securement point, although the securement or attachment subsystem described is currently preferred. As a further alternative, the securement could be made to some other part of the user's anatomy, for example, the user's head or ears or hat or the like or even with an upwardly extended, supplemental support attached to the user's belt, although a neck loop is currently preferred.

With respect to the confirguration of the head support element 1, there are many possibilities, including, for example, in particular but not exclusively the central shank portion 10, as well as the design and contour of the chin cup formed by the upper portion 20.

It should be understood that the foregoing variations and alternatives, etc., are merely exemplary and many other changes to the preferred, exemplary embodiment are possible within the teachings of the present invention.

It is noted that the embodiments of the present invention described herein in detail for exemplary purposes are of course subject to many different variations in structure, design, application, materials and methodology. Because many varying and different embodiments may be made within the scope of the inventive concept(s) herein taught, and because many modifications may be made in the embodiments herein detailed in accordance with the descriptive requirements of the law, it is to be understood that the details herein generally are to be interpreted as illustrative and not in a limiting sense.

What is claimed is:

1. A method of relaxing for someone sitting in a seat, with the someone being a user and having a neck, a chin having sides and a front, and a chest having a central, upper portion, comprising the following steps:
    a) placing a block of self-supporting material,—
        having a soft top with a curved, angled depression forming a cup for the chin adjacent to but spaced from the neck, between the chin and the user's chest, and
        having a bottom for contacting the user's chest supporting the user's head through the solid block on the user's chest,
    wherein the block of supportive material has a central shank portion with a reduced lateral size in comparison with its top and its bottom which are larger in their respective lateral sizes, and wherein, in association with step "a," there is included the further step of:
        holding the block of supportive material about its central, shank portion in one of the user's hand while the solid block is being placed between the user's chin and chest;
    b) securing the block of material in place on the user with the cup of the block of material interfacing with for full support the user's chin, and with the bottom of the block of material resting on the central upper portion of the user's chest, while positioned in front of the user's neck,
        b-1) looping an elongated, flexible member, having end portions, and which is attached to the block of supportive material, around the user's head; and
        b-2) securing the end portions of the elongated member, causing the loop to be fixed around the back of the user's neck, wherein the flexible member is a flexible line and there is further included a push-button/barrel lock through which the end portions of the elongated line pass; and
    wherein, in association with step "b-2," there is further included the steps of:
        pressing the push button and moving portions of the flexible line through the lock until the block of supportive material is positioned between the chin and the chest of the user in contact with both of them, and then releasing the push button, securing the end portions of the flexible line, attaching the block to the user's body about the user's neck; and
    c) allowing the chin to rest in the cup of the block of supportive material while secured to the user, who is relaxing, producing not only full support beneath the user's chin but also frontal contact with the front of the chin and support along the sides of the chin, while the user is sitting in a seat.

2. A head support system for supporting the head of a user while the user is sitting, the user having a neck, a chin having sides and a chest having a central upper portion, comprising:
    a block of self-supporting but soft, molded material having a central shank portion, a top portion placeable under and around and in front of the user's chin in supportive, "face-to-face" surface engagement therewith, while the block of material is positioned in front of the user's neck, and a bottom portion placeable on the central upper portion of the user's chest when the user's chin is fully supported in said depression area by said block of material;
    said top portion having a centrally located, curved, contoured, depression area which is downwardly angled toward the user when viewed from the side and also angled downwardly toward the user with upwardly extending sides substantially forming a combined "U" & "V" shape when viewed from the front, said depression area forming a cup into which the user's chin is placed, providing the user's chin with not only full support beneath the user's chin but also support on the front of the chin and along the sides of the chin; and
    an attachment subsystem connected to said block capable of securing the block in place under the user's chin.

3. The head support system of claim 2, wherein:
    said bottom has a bottom surface which is upwardly angled toward the user's neck when secured to the user below the chin and is capable of supporting said block of material and the weight of the user's head on the central, upper portion of the user's chest.

4. The head support system of claim 3, wherein:
said bottom surface is flat.

5. The head support system of claim 3, wherein:
said block has a central, longitudinally extended axis; and wherein:
said bottom portion is angled up at its rear at about a forty-five (45°) degree angle with respect to said central longitudinally extended axis, causing the device to rise, rather than uncomfortably "dig in" to the user's body, as it is moved back, strengthening the engagement of the device with the user's chin area, preventing or at least discouraging the device from being moved back against the user's throat.

6. The head support system of claim 2, wherein the user has a hand and wherein:
said shank portion has rounded sides and is of a dimension and configuration that is easily grippable in the hand of an adult user.

7. The head support system of claim 2, wherein said attachment subsystem comprises:
an elongated, flexible member attached to said block of material capable of extending in a loop around the user's neck.

8. The head support system of claim 7, wherein:
said elongated, flexible includes a strap member forming most of said loop and a attached string like member with two terminal ends extending out to and past the front of said block of material moveably attached thereto.

9. The head support system of claim 8, wherein:
said two terminal ends have front portions which are lockably attached together by means of a push button latch which allows said ends to be moved with respect to said latch when said button is depressed.

10. The head support system of claim 2, wherein:
said block of material is a solid material.

11. The head support system of claim 2, wherein:
said top portion is wider than said central shank portion.

12. A method of relaxing for someone traveling while sitting upright in a seat, with the someone being a user and having a neck, a chin having sides and a front, and a chest having a central, upper portion, comprising the following steps:
a) placing a block of self-supporting material,—
having a top and a soft top with a curved, angled depression forming a cup for the chin adjacent to but spaced from the neck, the block of supportive material having a central shank portion with a reduced lateral size in comparison with its top and its bottom which are larger in their respective lateral sizes,
between the chin and the user's chest by holding the block of supportive material about its central, shank portion in one of the user's hand while the block is being placed between the user's chin and chest, and
having a bottom for contacting the user's chest supporting the user's head through the solid block on the user's chest;
b) securing the block of material in place on the user with the cup of the block of material interfacing with for full support the user's chin, and with the bottom of the block of material resting on the central upper portion of the user's chest, and while positioned in front of the user's neck; and
c) allowing the chin to rest in the cup of the block of supportive material while secured to the user, producing not only full support beneath the user's chin but also frontal contact with the front of the chin and support along the sides of the chin.

13. The method of claim 12, wherein in step "b" there is further included the steps of:
b-1) looping an elongated, flexible member, having end portions, and which is attached to the block of supportive material, around the user's head; and
b-2) securing the end portions of the elongated member, causing the loop to be fixed around the back of the user's neck.

14. The method of claim 13, wherein the flexible member is a flexible line and there is further included a push-button/barrel lock through which the end portions of the elongated line pass; and wherein, in association with step "b-2," there is further included the steps of:
pressing the push button and moving portions of the flexible line through the lock until the block of supportive material is positioned between the chin and the chest of the user in contact with both of them, and then releasing the push button, securing the end portions of the flexible line, attaching the block to the user's body about the user's neck.

15. The method of claim 12, wherein said block of supportive material is longitudinally elongated with two laterally extended ends, and there is further included an around-the-back-of-the-neck loop associated with the block in front of the neck, and wherein there is included, in association with steps "a" & "b," the steps of:
lessening the size of the loop by pulling it in, while using the laterally extended ends of the block of supportive material's contacts with the user's chin area and the user's upper, central chest area to prevent the block from contacting at least the central part of the user's throat as the size of the loop is lessened and pulled in.

16. The method of claim 12, wherein, in association with step "a," there is further included the steps of:
placing the block of material with its soft top with its curved, angled depression up and around the user's chin, contacting the chin's front, sides, and bottom, including over in front, along side and around the mental protuberance and the central cleft area of the mandible of the user.

17. The method of claim 12, wherein, in association with step "a," there is further included the steps of:
placing the block of material with its bottom in contact and being supported on the user's manubrium sterni, approaching but spaced from the bottom tracheal cartilages of the user's neck.

18. The method of claim 12, wherein, in association with step "a," there is further included the steps of:
a-1) placing the block of material with its soft top with its curved, angled depression up and around the user's chin, contacting the chin's front, sides, and bottom, including over in front, along side and around the mental protuberance and the central cleft area of the mandible of the user, and with its bottom in contact and being supported on the user's manubrium sterni, approaching but spaced from the bottom tracheal cartilages of the user's neck; and
a-2) performing step "c" while the block is in the placement of step "a-1."

* * * * *